T. COOPER.
COOLING DEVICE.
APPLICATION FILED OCT. 24, 1910.
994,127.
Patented June 6, 1911.
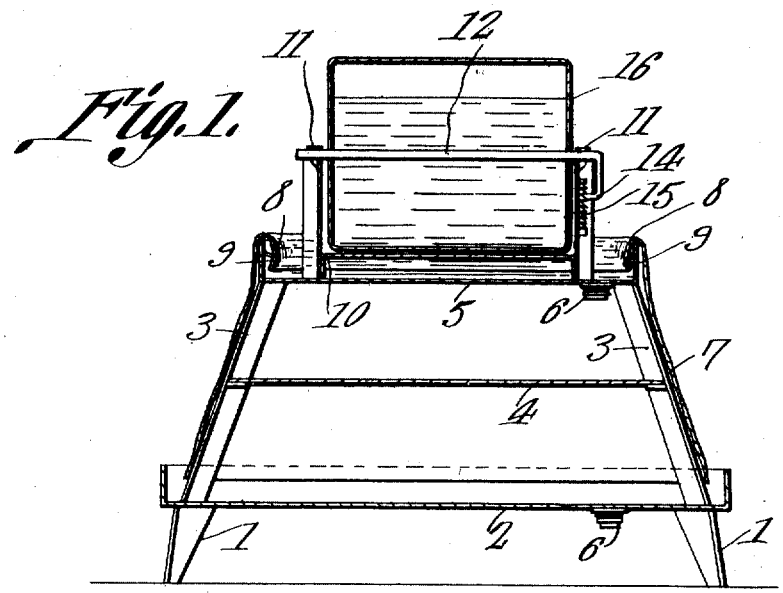
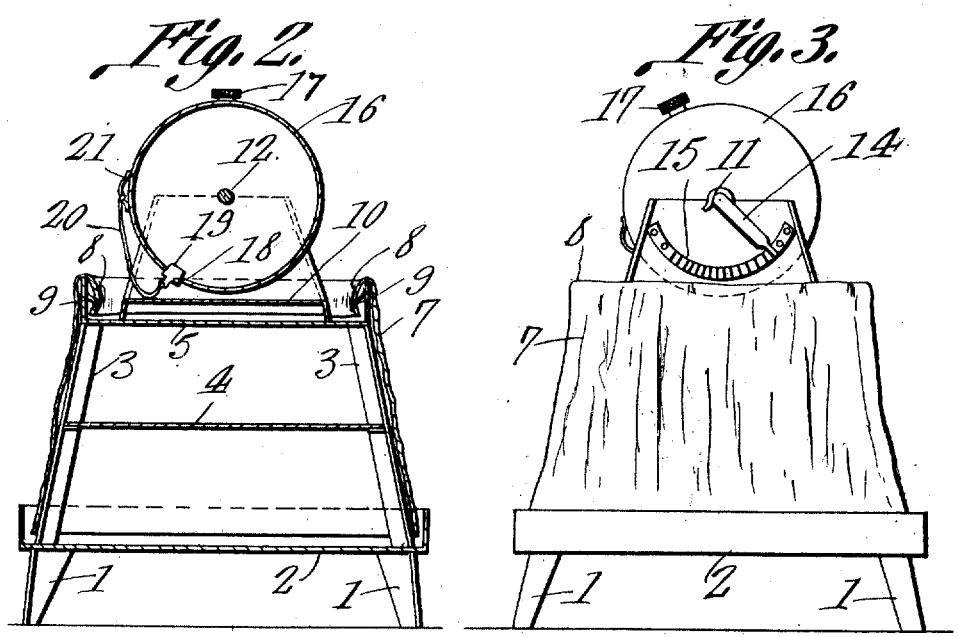
Witnesses
Thomas Cooper, Inventor
by C. A. Snow & Co.
Attorneys

UNITED STATES PATENT OFFICE.

THOMAS COOPER, OF RANGER, TEXAS.

COOLING DEVICE.

994,127. Specification of Letters Patent. Patented June 6, 1911.

Application filed October 24, 1910. Serial No. 588,774.

*To all whom it may concern:*

Be it known that I, THOMAS COOPER, a citizen of the United States, residing at Ranger, in the county of Eastland and State of Texas, have invented a new and useful Cooling Device, of which the following is a specification.

This invention relates to cooling devices, and more especially to that class of devices of this character which employ an absorbent surface; and the object of the same is to produce a device for cooling substances such as milk or the like by the use of water or other fluid cooling agent which permeates an absorbent surface.

To this end the invention consists in the peculiar structure of a water supply tank and its support so that the water feed can be regulated, as hereinafter more fully described and claimed and as shown in the drawings, wherein:

Figure 1 is a central longitudinal section of this device complete, Fig. 2 is a central transverse section, and Fig. 3 is an end view.

Referring to the drawings, the numerals 1 designate legs supporting a tray or pan 2 at some distance above the floor, and from this base pan rise four uprights which are preferably L-irons, numbered 3, and which may themselves support a number of shelves 4. By preference the uprights converge slightly as shown and their upper ends support an upper pan 5 which is therefore superposed above and smaller than the lower pan 2. All these parts form a frame which is of metal such as galvanized iron, and are rigidly connected. Both pans 2 and 5 have outlets of some character numbered 6 whereby the liquid therein can be drawn off from time to time for cleansing purposes. Numeral 7 designates a curtain of cloth surrounding the entire device, with its upper end 8 passing over into the pan 5 and engaging under hooks 9 and its base end hanging within the lower pan 2.

Resting within and somewhat smaller than the upper pan is a superstructure consisting of a framework 10 also preferably of metal and having end pieces which support bearings 11 wherein is mounted a shaft 12 which is shown as having at one end a spring arm 14 engaging a rack 15 on one of the end pieces. Fast on the rod is a drum 16 which has a filling opening at its top closed by a screw cap 17 or the like, and at a point almost directly opposite thereto there is an opening 18 closed by a plug 19 which may be hung on a cord 20 attached at 21 to the drum. The superstructure and its drum are also preferably of metal, but they are separate from the frame above described so that they may be taken apart for cleansing and repair.

In the operation of this device, the plug 19 is inserted and the filling orifice opened, and the drum is then filled with water. Thereafter the cap 17 is applied to close the filling orifice, the drum is turned about to the position shown in Fig. 2 or perhaps to a point where the opening 18 will be a little higher or lower, and held there by the downturned arm 14 engaging the rack 15, and the plug 19 is withdrawn. The water then flows out of the drum into the upper pan 5, until level with its upper edge, after which it will trickle over the same slowly. To avoid its escape in this way, the drum is set on its axis, so that the upper side of the opening 18 is just below a line across the upper edge of the pan 5, and it will be found that before the latter becomes filled to overflowing it will automatically check the flow of water from the drum until some of the water is withdrawn from the pan. The upper end or edge 8 of the curtain 7 hanging within the pan 5 absorbs from it a certain amount of liquid by capillary attraction, and this liquid is passed over the edge of the pan and trickles down the curtain and into the lower pan 2, thus maintaining a constant draft upon the liquid in the upper pan. As this reduces the height of the liquid therein, it opens the opening 18 to the admission of air, and liquid flows out of the drum and refills the upper pan 5. It follows therefore that by this structure the upper pan is kept constantly supplied with liquid to a line level with the upper edge of the hole 18 no matter whether atmospheric conditions cause the curtain to dissipate or evaporate the water rapidly or slowly. From time to time the curtain is removed and washed, and the cap 17 removed which will allow the water to rush out into the upper pan, flush the same, and flow over into the lower pan, from which it can be drawn through the opening 6. The fact that the superstructure is separate from the frame permits the parts to be cleansed separately at this time, and in order to use them again they are reassembled and the operation repeated as above.

This device is designed primarily for the cooling of milk, cream, and the like; but I do not wish to be confined thereto, because it is applicable to many other uses as will be clear.

What is claimed as new is:

1. In a cooling device, the combination with a frame including a base pan, a smaller upper pan, and a surrounding curtain whose upper edge passes over the edge of the upper pan and is secured therein and whose lower edge hangs within the base pan; of a superstructure including a framework smaller than and resting removably within the upper pan and having bearings, a shaft journaled therein, means for holding the shaft in its adjusted positions, and a drum fast on the shaft between its bearings and having inlet and outlet openings with separate means for closing them, the outlet opening being adapted to be brought to a point within said upper pan below the level of the water therein, for the purpose set forth.

2. In a cooling device, the combination with a frame including a base pan, a smaller upper pan, and a surrounding curtain whose upper edge passes over the edge of the upper pan and is secured therein and whose lower edge hangs within the base pan; of a superstructure including a framework smaller than and resting within the upper pan and having bearings, a rack on one end of the framework, a shaft journaled through the bearings and having an arm engaging the rack, a drum fast on the shaft and having inlet and outlet openings at substantially opposite points, the outlet opening adapted to be brought to a point within the upper pan below the lower edge thereof, and separate means for closing said openings.

In testimony that I claim the foregoing as my own, I have hereto affixed my signature in the presence of two witnesses.

THOS. COOPER.

Witnesses:
J. W. BARBER,
R. L. PAGE.

---

Copies of this patent may be obtained for five cents each, by addressing the "Commissioner of Patents, Washington, D. C."